United States Patent [19]

Athenes et al.

[11] 4,317,008
[45] Feb. 23, 1982

[54] MODULAR TIME-DIVISION SWITCHING NETWORK

[75] Inventors: Claude Athènes; Jean L. J. Meresse; Jacques E. Sallé, all of Colombes, France

[73] Assignee: Le Materiel Telephonique Thomson-CSF, Paris, France

[21] Appl. No.: 143,555

[22] Filed: Apr. 25, 1980

[30] Foreign Application Priority Data

Apr. 27, 1979 [FR] France ................. 79 10805

[51] Int. Cl.³ .............................. H04Q 3/60
[52] U.S. Cl. ............................. 179/18 FC
[58] Field of Search ........... 179/18 FC, 18 AD, 18 B, 179/18 BE, 18 EA; 370/85, 86, 88, 110

[56] References Cited

U.S. PATENT DOCUMENTS 4,007,338 2/1977 McLaughlin .............. 179/18 FC
4,021,619 5/1977 Potter et al. .............. 179/18 FC
4,150,258 4/1979 Fujimoto et al. .......... 179/18 FC Primary Examiner—Thomas A. Robinson
Attorney, Agent, or Firm—Oblon, Fisher, Spivak, McClelland & Maier

[57] ABSTRACT

The modular switching network for time-division telephone exchanges, which may be applied to small-capacity time-division telephone exchanges, is constituted by the direct connection of pairs of subscriber and trunk line connecting units by PCM digital trunks, each connecting unit comprising a concentration-deconcentrator device for serving the subscribers associated with this connecting unit.

6 Claims, 9 Drawing Figures

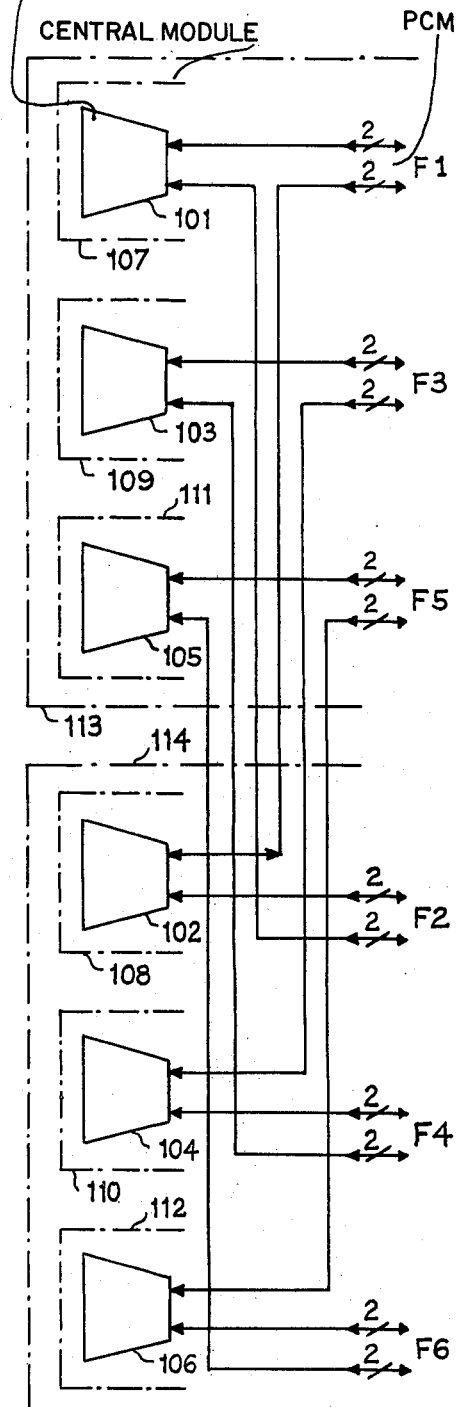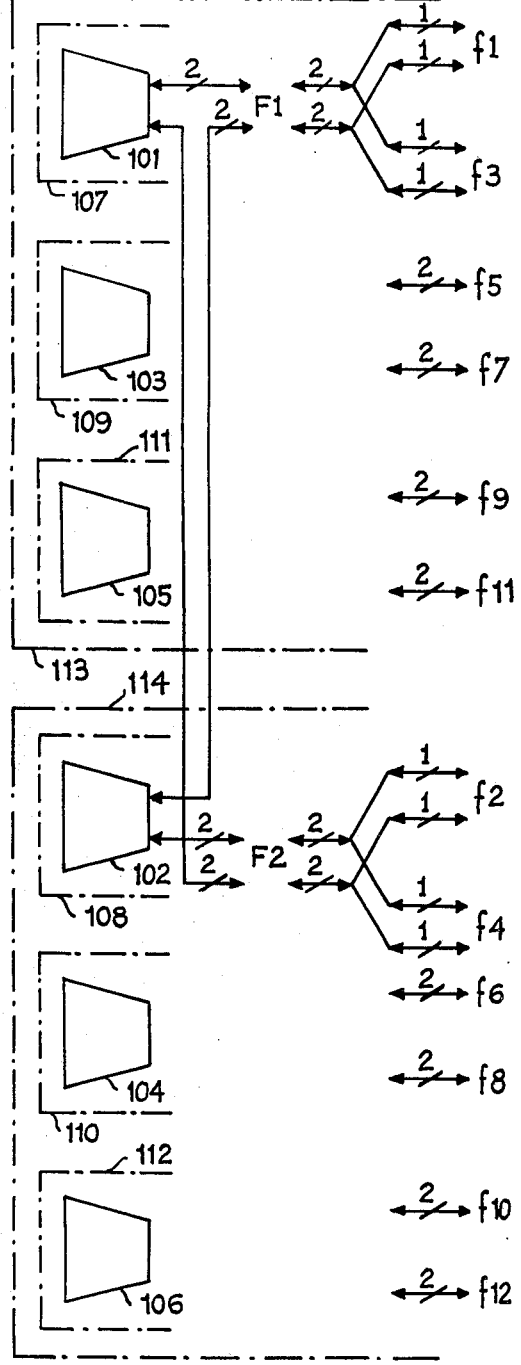
Fig. 2 A  Fig. 2 B

| 2 | 3 | 4 | 5 | 6 | 7 |
|---|---|---|---|---|---|
| F1U1 ↔ F1U2 | F1U1 ↔ F1U2 | F1U1 ↔ F1U2 | F1U1 ↔ F1U2 | F1U1 ↔ F1U2 | F1U1 ↔ F1U2 |
| | F2U1 ↔ F1U3<br>F2U2 ↔ F2U3 | F2U1 ↔ F1U3<br>F2U2 ↔ F2U3 | F2U1 ↔ F1U3<br>F2U2 ↔ F2U3 | F2U1 ↔ F1U3<br>F2U2 ↔ F2U3 | F2U1 ↔ F1U3<br>F2U2 ↔ F2U3 |
| | | F3U1 ↔ F1U4<br>F3U2 ↔ F2U4<br>F3U3 ↔ F3U4 | F3U1 ↔ F1U4<br>F3U2 ↔ F2U4<br>F3U3 ↔ F3U4 | F3U1 ↔ F1U4<br>F3U2 ↔ F2U4<br>F3U3 ↔ F3U4 | F3U1 ↔ F1U4<br>F3U2 ↔ F2U4<br>F3U3 ↔ F3U4 |
| | | | F4U1 ↔ F1U5<br>F4U2 ↔ F2U5<br>F4U3 ↔ F3U5<br>F4U4 ↔ F4U5 | F4U1 ↔ F1U5<br>F4U2 ↔ F2U5<br>F4U3 ↔ F3U5<br>F4U4 ↔ F4U5 | F4U1 ↔ F1U5<br>F4U2 ↔ F2U5<br>F4U3 ↔ F3U5<br>F4U4 ↔ F4U5 |
| | | | | F5U1 ↔ F1U6<br>F5U2 ↔ F2U6<br>F5U3 ↔ F3U6<br>F5U4 ↔ F4U6<br>F5U5 ↔ F5U6 | F5U1 ↔ F1U6<br>F5U2 ↔ F2U6<br>F5U3 ↔ F3U6<br>F5U4 ↔ F4U6<br>F5U5 ↔ F5U6 |
| | | | | | F6U1 ↔ F1U7<br>F6U2 ↔ F2U7<br>F6U3 ↔ F3U7<br>F6U4 ↔ F4U7<br>F6U5 ↔ F5U7<br>F6U6 ↔ F6U7 |

Fig.3

| 2 | 3 | 4 | 5 | 6 | 7 |
|---|---|---|---|---|---|
| F1U1 ↔ F1U2 | F1U1 ↔ F1U2 | F1U1 ↔ F1U2 | F1U1 ↔ F1U2 | F1U1 ↔ F1U2 | F1U1 ↔ F1U2 |
|  | F2U1 ↔ F1U3<br>F2U2 ↔ F2U3 | F2U1 ↔ F1U3<br>F2U2 ↔ F2U3 | F2U1 ↔ F1U3<br>F2U2 ↔ F2U3 | F2U1 ↔ F1U3<br>F2U2 ↔ F2U3 | F2U1 ↔ F1U3<br>F2U2 ↔ F2U3 |
|  |  | F3U1 ↔ F1U4<br>F3U2 ↔ F2U4<br>F3U3 ↔ F3U4 | F3U1 ↔ F1U4<br>F3U2 ↔ F2U4<br>F3U3 ↔ F3U4 | F3U1 ↔ F1U4<br>F3U2 ↔ F2U4<br>F3U3 ↔ F3U4 | F3U1 ↔ F1U4<br>F3U2 ↔ F2U4<br>F3U3 ↔ F3U4 |
|  |  |  | F4U1 ↔ F1U5<br>F4U2 ↔ F2U5<br>F4U3 ↔ F3U5<br>F4U4 ↔ F4U5 | F4U1 ↔ F1U5<br>F4U2 ↔ F2U5<br>F4U3 ↔ F3U5<br>F4U4 ↔ F4U5 | F4U1 ↔ F1U5<br>F4U2 ↔ F2U5<br>F4U3 ↔ F3U5<br>F4U4 ↔ F4U5 |
|  |  |  |  | F5U1 ↔ F1U6<br>F5U2 ↔ F2U6<br>F5U3 ↔ F3U6<br>F5U4 ↔ F4U6<br>F5U5 ↔ F5U6 | F5U1 ↔ F1U6<br>F5U2 ↔ F2U6<br>F5U3 ↔ F3U6<br>F5U4 ↔ F4U6<br>F5U5 ↔ F5U6 |
|  |  |  |  |  | F6U1 ↔ F1U7<br>F6U2 ↔ F2U7<br>F6U3 ↔ F3U7<br>F6U4 ↔ F4U7<br>F6U5 ↔ F5U7<br>F6U6 ↔ F6U7 |

Fig. 6A

| 8 | 9 | 10 |
|---|---|---|
| F7U1 ↔ F1U8 | F7U1 ↔ F1U8 | F7U1 ↔ F1U8 |
| F7U2 ↔ F2U8 | F7U2 ↔ F2U8 | F7U2 ↔ F2U8 |
| F7U3 ↔ F3U8 | F7U3 ↔ F3U8 | F7U3 ↔ F3U8 |
| F7U4 ↔ F4U8 | F7U4 ↔ F4U8 | F7U4 ↔ F4U8 |
| F7U5 ↔ F5U8 | F7U5 ↔ F5U8 | F7U5 ↔ F5U8 |
| F7U6 ↔ F6U8 | F7U6 ↔ F6U8 | F7U6 ↔ F6U8 |
| F7U7 ↔ F7U8 | F7U7 ↔ F7U8 | F7U7 ↔ F7U8 |
| F7U8 ↔ F8U8 | F7U8 ↔ F8U8 | F7U8 ↔ F8U8 |
|  | F8U1 ↔ F1U9 | F8U1 ↔ F1U9 |
|  | F8U2 ↔ F2U9 | F8U2 ↔ F2U9 |
|  | F8U3 ↔ F3U9 | F8U3 ↔ F3U9 |
|  | F8U4 ↔ F4U9 | F8U4 ↔ F4U9 |
|  | F8U5 ↔ F5U9 | F8U5 ↔ F5U9 |
|  | F8U6 ↔ F6U9 | F8U6 ↔ F6U9 |
|  | F8U7 ↔ F7U9 | F8U7 ↔ F7U9 |
|  | F8U8 ↔ F8U9 | F8U8 ↔ F8U9 |
|  |  | F9U1 ↔ F1U10 |
|  |  | F9U2 ↔ F2U10 |
|  |  | F9U3 ↔ F3U10 |
|  |  | F9U4 ↔ F4U10 |
|  |  | F9U5 ↔ F5U10 |
|  |  | F9U6 ↔ F6U10 |
|  |  | F9U7 ↔ F7U10 |
|  |  | F9U8 ↔ F8U10 |
|  |  | F9U9 ↔ F9U10 |

Fig. 6B

MODULAR TIME-DIVISION SWITCHING NETWORK

BACKGROUND OF THE INVENTION

1. Field of the Invention

The present invention relates to a modular switching network for time-division telephone exchanges using the pulse code modulation technique. The present invention relates more particularly to small-capacity exchanges or switches, making use of concentrator-deconcentrator devices.

2. Description of the Prior Art

Conventional switching networks consist of complex assemblies of circuits known as time-division switches and space-division switches occupying much of the volume of exchanges including them. In addition, these complex assemblies are ill-adapted to the production of easily extensible small-capacity exchanges.

The size of switching networks may be reduced by the use of concentration techniques based on the fact that not all subscribers use their lines at the same time, making it possible to connect to an exchange a number of subscribers greater than the total number of inputs to the switching network of this exchange.

Concentration techniques are implemented by means of concentrator-deconcentrator devices, one of these devices embodying time-division switching arrays known as symmetrical time-division arrays. This concentrator-deconcentrator device includes a centralized part comprising a central module consisting of symmetrical time-division arrays and which connect subscribers to a switch in order to ensure communication with subscribers who are not dependent on the concentrator-deconcentrator device.

This concentrator-deconcentrator device comprises at the same time a centralized concentrator part and a decentralized concentrator part for ensuring communications in both directions, these parts being located in the terminal modules which comprise the subscriber and auxiliary line connecting units and which constitute what is conventionally known as a subscriber and trunk line connecting unit.

SUMMARY OF THE INVENTION

Accordingly, one object of this invention is to provide a novel modular time-division switching network for an extensible small-capacity exchange and which avoids the use of a conventional centralized network.

According to one characteristic of the invention, this switching network is materialized by the direct connection of the subscriber and trunk line connecting units via PCM digital trunks serving these connecting units in pairs.

It should be recalled that the PCM technique consists in sampling the speech signals at a rate of 8 kHz and then in quantizing and encoding these samples in the form of digital signals in which each sample is represented by an 8-bit word.

Time multiplexing allows the transmission of signals from different subscribers via a single PCM digital trunk, this type of multiplexing conventionally providing 24 or 30 telephone channels per trunk (CCITT standard).

In the remainder of the present text, in order to simplify, mention will be made of "connecting units" only, which should be interpreted as "subscriber and trunk line connecting units".

BRIEF DESCRIPTION OF THE DRAWINGS

A more complete appreciation of the invention and many of the attendant advantages thereof will be readily obtained as the same becomes better understood by reference to the following detailed description when considered in connection with accompanying drawings, wherein:

FIGS. 2A and 2B represent two types of distribution of trunks from the central modules located in the same connecting unit;

FIG. 3 represents in tabular form a method of connecting 2 to 7 connecting units;

FIGS. 6A and 6B represent in tabular form a type of connection of 2 to 10 connecting units;

DESCRIPTION OF THE PREFERRED EMBODIMENTS

Figure 1:
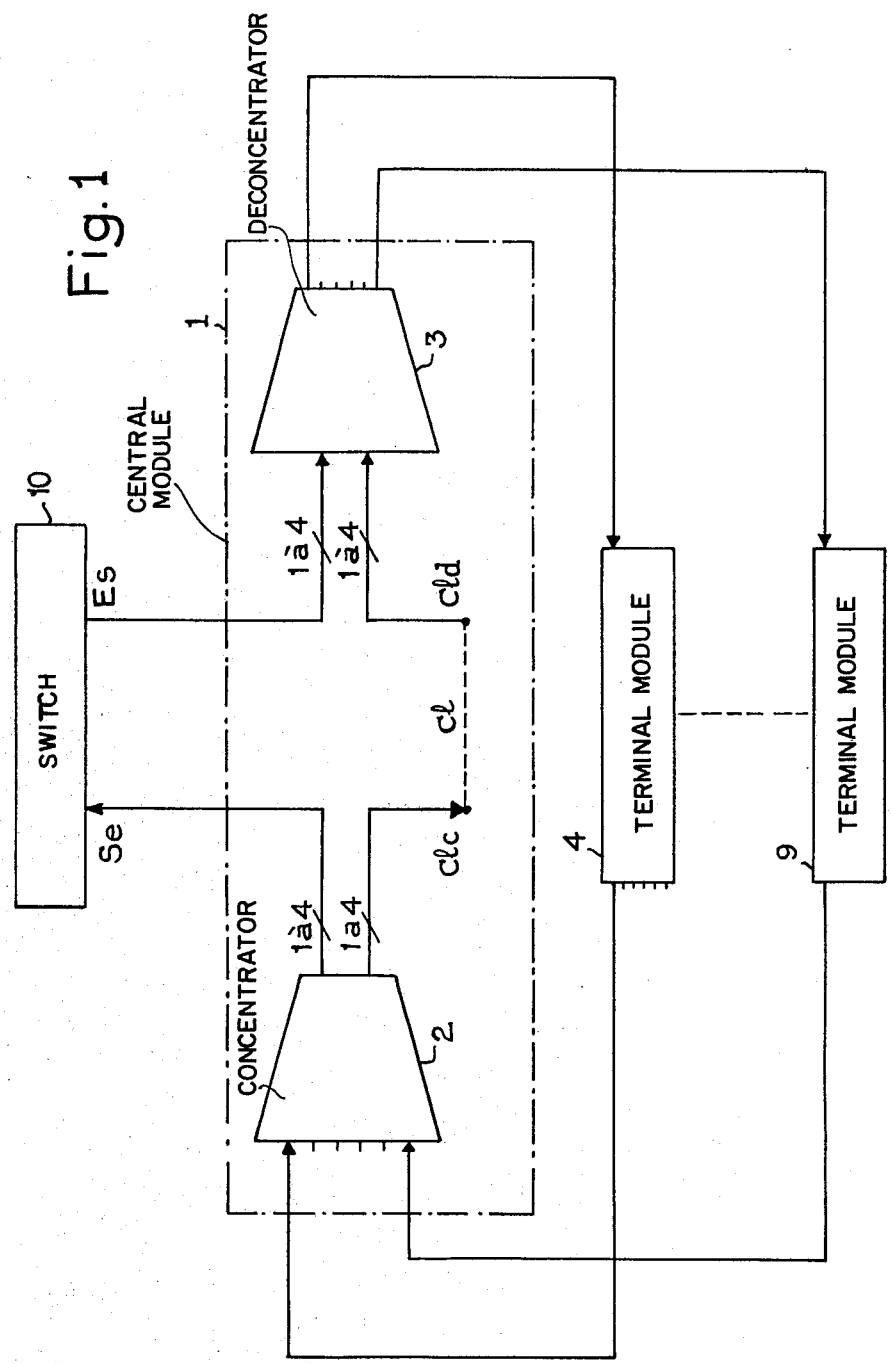
FIG. 1 schematically represents a central module of a concentrator-deconcentrator as defined above.

Referring now to the drawings, wherein like reference numerals designate identical or corresponding parts throughout the several views, and more particularly to FIG. 1 thereof which shows a central module comprising a part 2 relating to concentration and a part 3 relating to deconcentration, the inputs of part 2 are constituted by PCM trunks from as many connecting modules numbered 4 to 9, this number of trunks being six in an illustrative embodiment.

Similarly, the outputs of part 3 are constituted by as many PCM return trunks to the terminal modules 4 to 9.

PCM trunks Se leaving part 2 and PCM trunks Es, at a maximum, entering in part 3, are intended for connections to a switch 10, i.e. for connections between the connecting units in the case of a small-capacity exchange. In an illustrative embodiment, the respective numbers of trunks Se and Es are equal and vary between 1 and 4.

In addition, trunks Clc on the output of part 2 and trunks Cld on the input of part 3 are available for making local connections Cl between parts 2 and 3, their number being equal to that of trunks Es and Se in the illustrative embodiment.

A subscriber and trunk line connecting unit comprises central modules divided into two groups. In an illustrative embodiment, each unit comprises six central modules.

FIGS. 2A and 2B represent the parts relating to the concentration and deconcentration 101 to 106 of six central modules 107 to 112 divided into two groups of central modules 113 and 114. In FIG. 2A, six groups F1 to F6 constituted by the PCM trunks Se and Es shown in FIG. 1 are connected to said central modules 107 to 112 such that each group, such as group F1, is connected to two central modules, such as central modules 107 and 108 not located in the same group of central modules. In the example adopted, central module 107 is located in group 113, whilst central module 108 is located in group 114. This, which implies that the number of central modules fitted is even, is provided for security reasons. In the event of total failure of a group of central modules, the traffic can thus be carried, at least partially, by the other group of central modules.

FIG. 2B shows that groups F1 to F6, each of which comprises four trunks in the example adopted, can be divided to constitute 2-trunk groups f1 to f12. Amongst the four trunks constituting group F1, the two trunks connected to the central module 107 as well as the two trunks connected to the central module 108 are thus divided for security reasons between groups f1 and f3 in order to constitute two groups of two junctions f1 and f3.

The description of the modular time-division switching network produced by the connection of connecting units refers to FIGS. 1, 2 and 3.

Three basic configurations for the connection of connecting units are proposed, depending on the number of connecting units to be connected and depending on the traffic load, as well as a variant for interconnecting 1 to 10 connecting units. The interconnection of n connecting units requires the use of $(n-1)$ groups per connecting unit, a 4-trunk group being able to carry a traffic of 90 Erlangs and a 2-trunk group being able to carry a traffic of 40 Erlangs, these values being approximate. For example, in the case of six central modules, groups F1 to F6 shown in FIG. 2A allow the interconnection of seven connecting units.

In general, the connecting unit interconnection law may be stated as follows: the group $F_i$ of connecting unit $U_j$ $(j \geq i)$ is connected to the group $F_j$ of the connecting unit $U_{i+1}$.

The first configuration relates to the connection of connecting units U1 to U7, illustrated by the table in FIG. 3.

In this table, the figure at the top of each column represents the number of connecting units which should be interconnected. A single connecting unit U1 fitted with two central modules, each therefore comprising two groups of four local trunks, can carry a traffic of 180 Erlangs. Two connecting units U1 and U2 are connected by means of a single group F1, which is expressed by the table in FIG. 3 by F1U1⇌F1U2. In this case, if the local traffic in each connecting unit U1 or U2 is equal to the traffic to the other unit, each connecting unit U1 or U2 can carry a total traffic of 180 Erlangs. The table in FIG. 3 indicates the connections which may be made between groups from the connecting units U1 to U7 to be connected in accordance with the interconnection law stated above.

The second line of the following table indicates the number m1 of central modules per connecting unit, whilst the third line indicates the total number p1 of 8-pair cables interconnecting the connecting units to be used as a function of the number n1 of these units indicated in the first line.

TABLE 1

| n1 | 2 | 3 | 4 | 5 | 6 | 7 |
|---|---|---|---|---|---|---|
| m1 | 2 | 2 | 4 | 4 | 6 | 6 |
| p1 | 1 | 3 | 6 | 10 | 15 | 21 |

The connection of n1 $(2 \leq n1 \leq 7)$ terminal units thus requires the use of $(n1-1)$ 4-trunk groups per connecting unit, therefore m1 central modules per connecting unit, m1 being an even number equal or immediately greater than $(n1-1)$. In addition, the total number of 8-pair cables, i.e. the total number of 4-trunk groups interconnecting the connecting units is equal to the number of combinations of two connecting units selected out of n1 units: $p1 = C_{n1}^2$.

Assume that each connecting unit carries the same traffic load T. Since in addition to the $(m1-1)$ 4-trunk groups per connecting unit there is a local connecting trunk group, each group $F_i$ $(1 \leq i \leq 6)$ carries a traffic load equal to $T/n1$, assuming that each group $F_i$ as well as the local connecting trunk group carries the same traffic load.

The second configuration relates to the connection of 5 to 13 subscriber and trunk line connecting units. According to the above, when the number n of racks increases, the traffic load $T/n$ carried by each group $F_i$ decreases. For $n=5$ and $T=180$ Erlangs, this traffic per group $F_i$ is 36 Erlangs. In this case, two trunks per group suffice.

For a given traffic load T of 180 Erlangs for example, it is therefore possible with a certain number of racks (5 in the example considered) to use the groups shown in FIG. 2B for interconnecting up to 13 connecting units. The interconnection law for these units is the same as that stated above.

The second line in the following table indicates the number m2 of central modules per connecting unit, whilst the third line indicates the total number p2 of 4-pair cables interconnecting the connecting units as a function of the number n2 $(5 < n2 < 13)$ of connecting units shown in the first line.

TABLE 2

| n2 | 5 | 6 | 7 | 8 | 9 | 10 | 11 | 12 | 13 |
|---|---|---|---|---|---|---|---|---|---|
| m2 | 2 | 4 | 4 | 4 | 4 | 6 | 6 | 6 | 6 |
| p2 | 10 | 15 | 21 | 28 | 36 | 45 | 55 | 66 | 78 |

The connection of n2 $(5 \leq n2 \leq 13)$ connecting units thus requires the use of n2 central modules per connecting unit, n2 being equal to $$2 \times PE\left(\frac{n2+2}{4}\right),$$

where PE designates the whole-number part of the expression. In addition, the total number of 4-pair cables, i.e. the total number of 2-trunk groups interconnecting the connecting units is, as for the first configuration, given by the formula $p2 = C_{n2}^2$.

Figure 4:
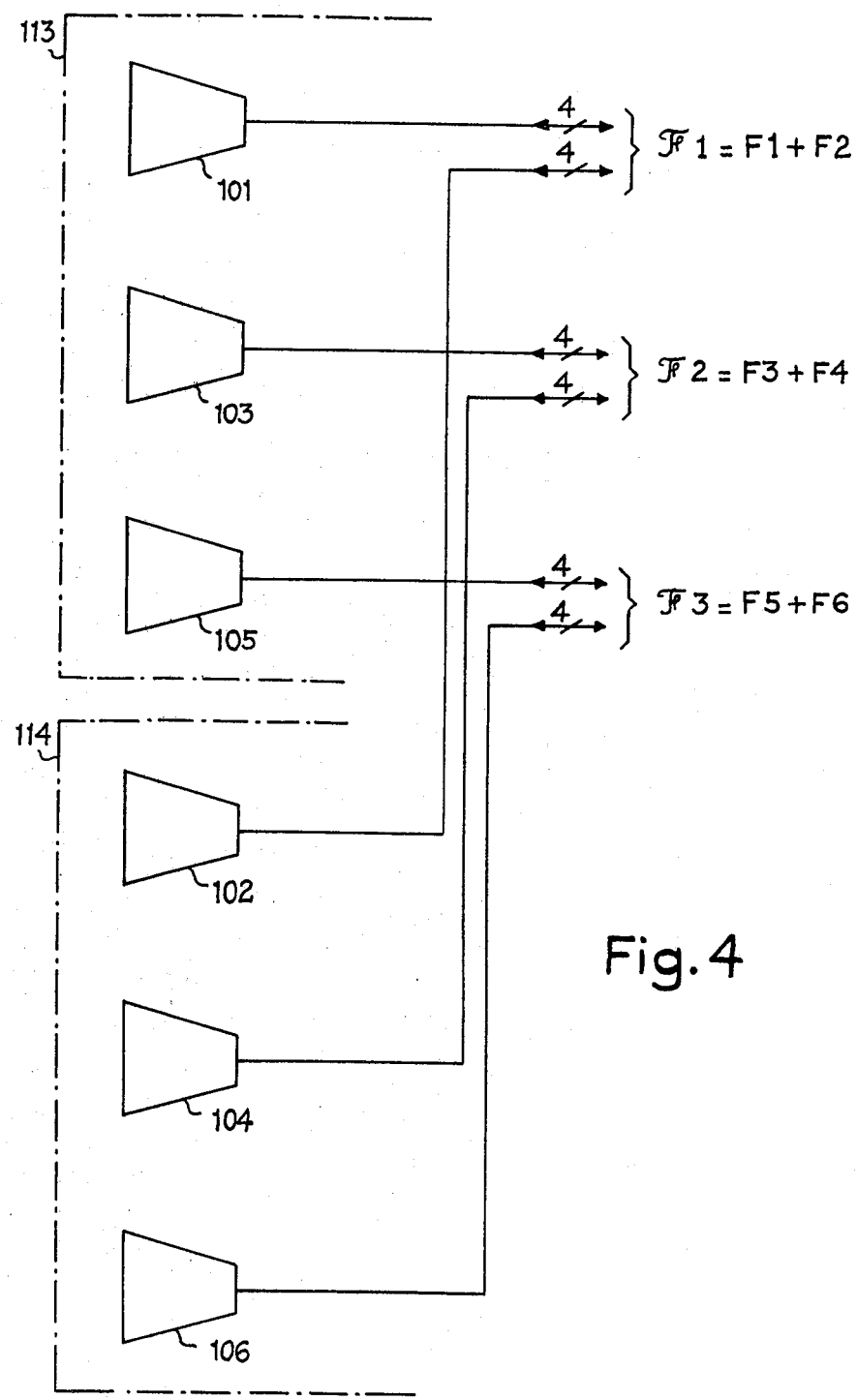
FIG. 4 represents a type of distribution of trunks from central modules located in the same connecting unit in the case of very heavy traffic connecting units.

A third configuration covers the case of very high traffic connecting units. In the case of a single connecting unit, it is merely necessary to add central modules, but in the case of several connecting units, the 4-trunk groups $F_i$ used in the first configuration are insufficient. For two connecting units, as mentioned above, the maximum total traffic carried by each connecting unit is thus 180 Erlangs. The groups $F_i$ of the first configuration may then be grouped in pairs to create three groups F1 to F3 of eight PCM trunks, each carrying 190 Erlangs. FIG. 4 is a variant of the diagram in FIG. 2A, grouping the six groups F1 to F6 into three groups F1 and F3. The three groups F1 to F3 allow the connection of up to four very heavy traffic connecting units in accordance with the interconnection law stated earlier. The second line of the following table indicates the number m3 of central modules per connecting unit, whilst the third line indicates the number p3 of 16-pair cables interconnecting the connecting units, these numbers of modules and cables being those to be used as a function of the number n3 (1<n3<4) of connecting units indicated in the first line.

TABLE 3

| n3 | 1 | 2 | 3 | 4 |
|---|---|---|---|---|
| m3 | 4 | 2 | 4 | 6 |
| p3 | 0 | 1 | 3 | 6 |

Figure 5:
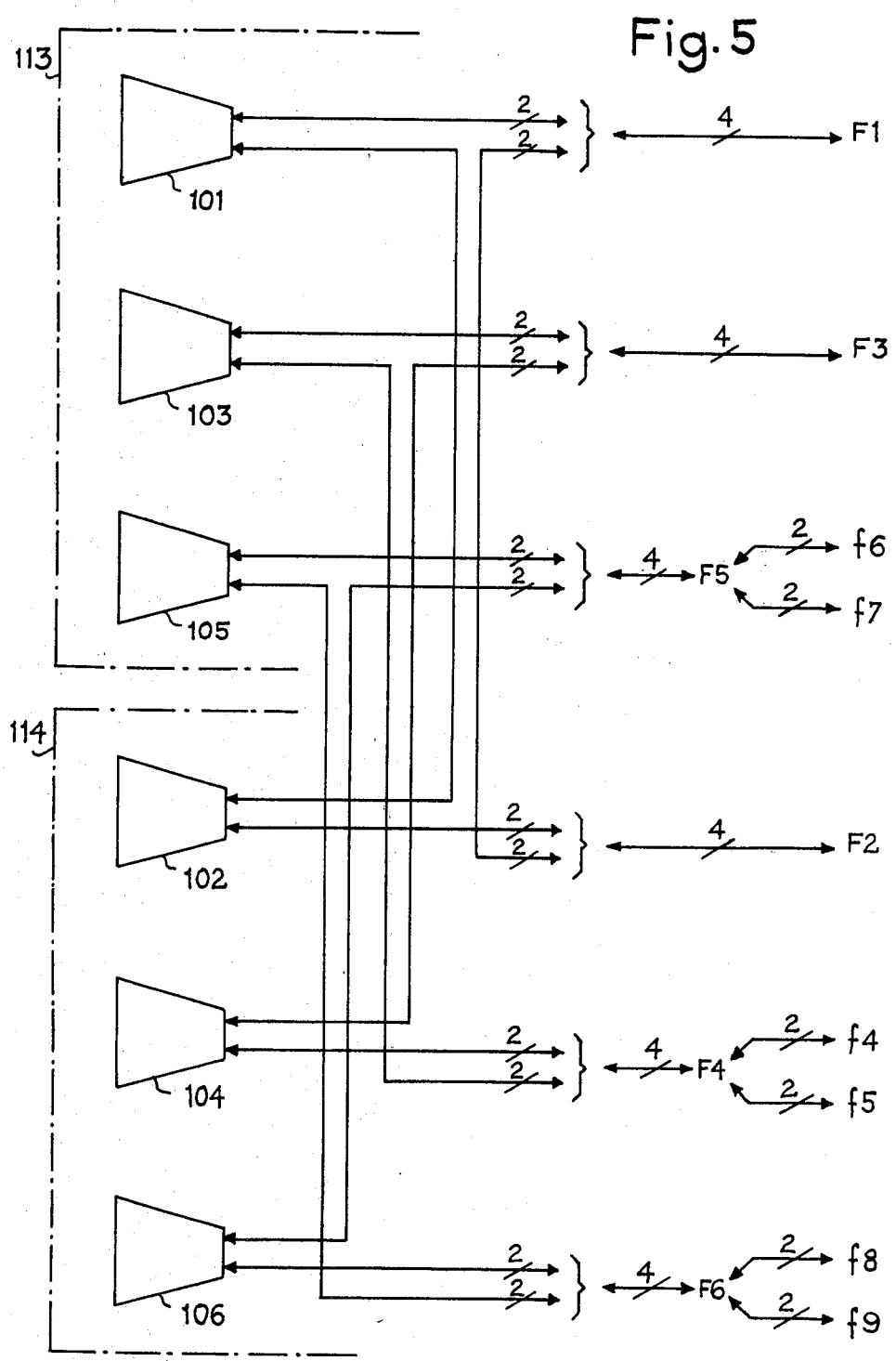
FIG. 5 represents a type of distribution of trunks from central modules located in the same connecting unit, this in a variant for connecting 1 to 10 connecting units.

A variant for connecting 1 to 10 connecting units U1 to U10 may be deduced from the first and second configurations described above. It has been found that for five units or more with an average traffic load of 180 Erlangs per unit, the interconnections may be made by 2-trunk groups. The 24 PCM trunks from a maximum of six central modules included in a connecting unit may be grouped for half of this number into three 4-trunk groups and for the other half into six 2-trunk groups. FIG. 5 is thus a variant of the diagram in FIG. 2A: the four-trunk groups F1, F2 and F3 are retained, whilst the groups F4 to F6 are subdivided into six two-trunk groups f4 to f9, such that F4=f4+f5, F5=f6+f7 and F6=f8+f9. The nine groups F1 to F3 and f4 to f9 enable up to ten connecting units to be connected, the first four being interconnected by the 4-trunk groups F1 to F3.

The table in FIG. 6A indicates the connections made between groups in the case of connecting 2 to 7 connecting units U1 to U7. The table in FIG. 6B indicates the additional connections made between groups when connecting 8 to 10 connecting units U1 to U10. In each of these tables, the figure at the top of each column indicates the number of connecting units which should be interconnected in accordance with the general interconnection law stated earlier.

Extensions from 1 to 10 connecting units are made by adding 8-pair or 4-pair cables and central modules of the concentrator-deconcentrator device. The second line of the following table indicates the number n4 of central modules per connecting unit, whilst the third and fourth lines indicate the numbers p41 and p42 of the 8-pair and 4-pair tables respectively interconnecting the connecting units U1 to U10. These numbers m4, p41 and p42 depend on the number n4 of connecting units indicated in the first line of the table.

TABLE 4

| n4  | 1 | 2 | 3 | 4 | 5 | 6 | 7  | 8  | 9  | 10 |
|-----|---|---|---|---|---|---|----|----|----|----|
| m4  | 2 | 2 | 4 | 4 | 4 | 4 | 6  | 6  | 6  | 6  |
| p41 | 0 | 1 | 3 | 6 | 6 | 6 | 6  | 6  | 6  | 6  |
| p42 | 0 | 0 | 0 | 0 | 4 | 9 | 15 | 22 | 30 | 39 |

Figure 7:
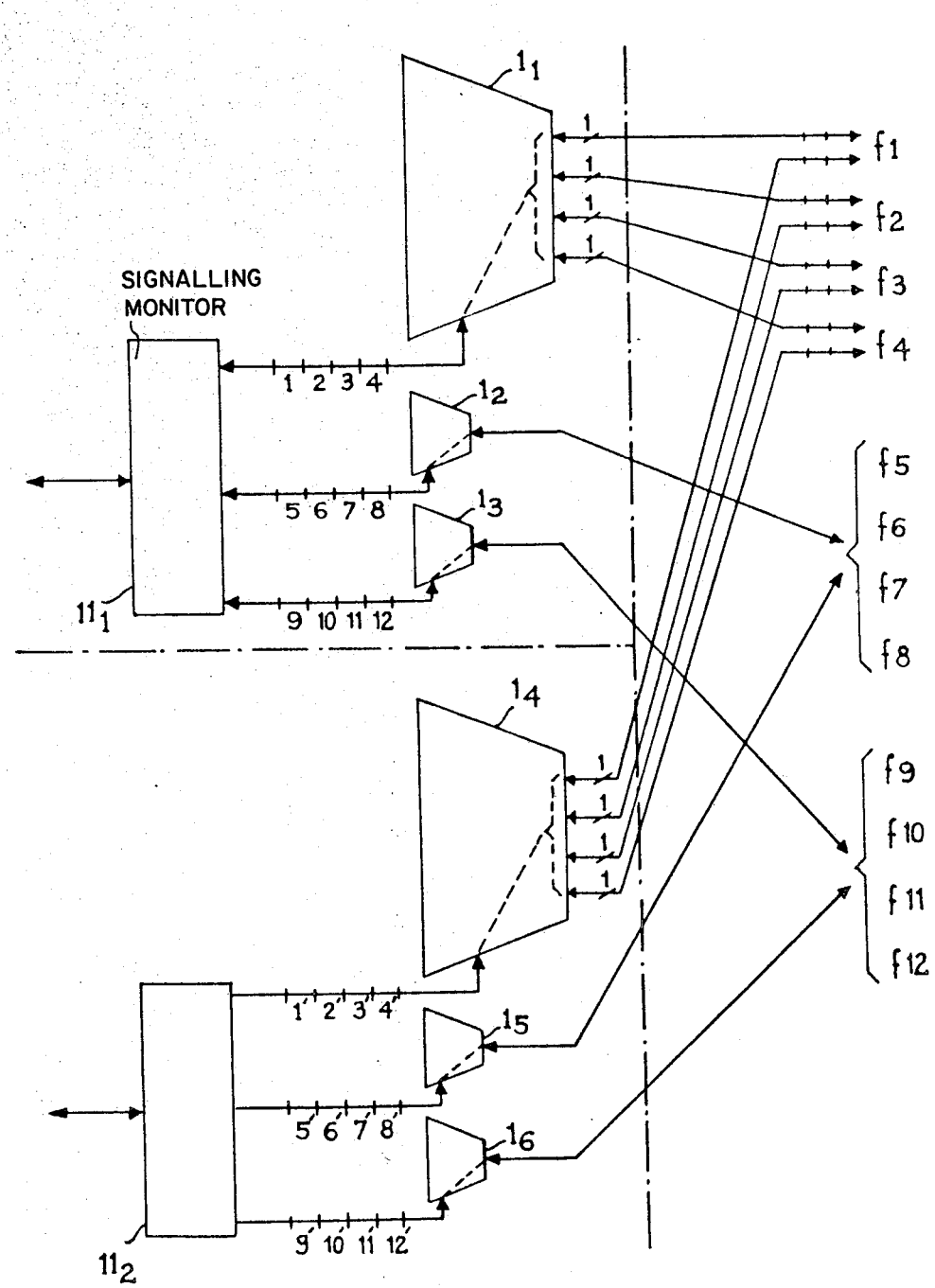
FIG. 7 represents the connection of the signalling monitor to the network.

The connection of connecting units by a switching network without a centralized part requires the transmission of messages between terminal units by common-channel signalling (FIG. 7). In each group interconnecting two connecting units, a send channel and a return channel are thus reserved in a PCM trunk connected to the central module corresponding to the group. For security reasons, this signalling channel is duplicated in another PCM trunk of the group. In each of the two groups of central modules contained in a connecting unit, a signalling monitor 11 monitors the signalling carried by the signalling channels of the groups corresponding to the central modules of the group. For each group, one of the two signalling monitors checks one of the two channels, whilst the other signalling monitors checks the other channel.

It should be clearly understood that the configurations proposed and the connection variant are described and illustrated above as preferential examples only. The size of the PCM trunk groups from and to the central modules depends on the number of connecting units to be connected and the traffic load carried by these connecting units. Each case of connecting unit connection results in a specific switching network whose configuration is based on the present invention, the scope of this invention being apparent from the appended claims.

Obviously, numerous modifications and variations of the present invention are possible in light of the above teachings. It is therefore to be understood that within the scope of the appended claims, the invention may be practiced otherwise than as specifically described therein.

What is claimed as new and desired to be secured by Letters Patent of the United States is:

1. A modular switching network for small-capacity time-division telephone exchange units for interconnecting subscriber and trunk line connecting units, each subscriber and trunk line connecting unit comprising a certain number of PCM trunks for connecting said subscriber and trunk line connecting units to said exchange units, and each said PCM trunk constituting an input and an output of a central module contained in the subscriber trunk line connecting unit, wherein the subscriber and trunk line connecting units are connected directly in pairs by said PCM trunks.

2. A modular switching network in accordance with claim 1, wherein the PCM trunks interconnecting two subscriber and trunk line connecting units constitute a group whose size depends on the total number of subscriber and trunk line connecting units to be connected and the traffic carried by these subscriber and trunk line connecting units.

3. A modular switching network in accordance with claim 1 or 2, wherein for security reasons the central modules located in the same subscriber and trunk line connecting unit are divided into two groups of central modules operating independently of each other, and wherein each group to and from each subscriber and trunk line connecting unit consists of PCM trunks of which some are connected to a central module belonging to a group of central modules, the remaining being connected to a central module belonging to the other group of central modules.

4. A modular switching network in accordance with claim 1 or 2, wherein the exchange of signalling between two subscriber and trunk line connecting units is performed over a send channel and a return channel of at least one PCM trunk interconnecting these two racks.

5. A modular switching newtwork in accordance with claim 4, wherein one send channel and one return channel are reserved for signalling over two PCM trunks of the group, one of the two PCM trunks being connected to a central unit belonging to one of the two groups of central modules, and the other PCM trunk being connected to a central module belonging to the other group of central modules.

6. A modular switching network in accordance with claim 5, wherein each subscriber and trunk line connecting unit comprises in addition two signalling monitor devices each assigned to a different group of central modules and each signalling monitor device monitoring the signalling exchanged between said subscriber and trunk line connecting unit and the other units, carried by the various PCM trunks connected to the different central modules belonging to the group of central modules to which said signalling monitor device is assigned.

* * * * *